United States Patent [19]

Urano et al.

[11] 4,440,403
[45] Apr. 3, 1984

[54] DROP-PROOF AND DUST-PROOF DEVICE IN ROTARY OPERATION SECTION OF CAMERA

[75] Inventors: Fumio Urano, Omiya; Junji Umetsu, Kita, both of Japan

[73] Assignee: Asahi Kogaku Kogyo Kabushiki Kaisha, Tokyo, Japan

[21] Appl. No.: 906,802

[22] Filed: May 17, 1978

[30] Foreign Application Priority Data

May 30, 1977 [JP] Japan .............................. 52/69535[U]
May 30, 1977 [JP] Japan .............................. 52/69536[U]

[51] Int. Cl.³ ............................................... F16J 15/32
[52] U.S. Cl. ...................................... 277/81 R; 277/88
[58] Field of Search ................... 215/346; 277/81, 91, 277/92

[56] References Cited

U.S. PATENT DOCUMENTS

| | | | |
|---|---|---|---|
| 795,283 | 7/1905 | Hull | 215/346 |
| 2,107,179 | 2/1938 | Gibbs | 215/346 |
| 2,937,039 | 5/1960 | Santapa | 277/81 R |
| 3,510,138 | 5/1970 | Bowen et al. | 277/153 |
| 4,061,345 | 12/1977 | Lund | 277/88 |
| 4,085,941 | 4/1978 | Wilkerson | 277/88 |
| 4,142,731 | 3/1979 | Filippou et al. | 277/88 |

*Primary Examiner*—Robert I. Smith
*Attorney, Agent, or Firm*—Sughrue, Mion, Zinn, Macpeak and Seas

[57] ABSTRACT

Eccentricity between an external knob and camera casing is accommodated by providing a flexible rubber ring between the two which will bend during a change in their relative positions so that a good seal is continuously maintained. Sealing can also be enhanced by extending the rubber gripping ring around the circumference of the knob down to the camera casing so that the sealing and operating rings are integral.

2 Claims, 10 Drawing Figures

DROP-PROOF AND DUST-PROOF DEVICE IN ROTARY OPERATION SECTION OF CAMERA

BACKGROUND OF THE INVENTION

This invention relates to a water-drop-proof (hereinafter referred to merely as "drop-proof" when applicable) and dust-proof means in a camera.

A conventional camera is disadvantageous when used in a rainy or dusty environment or in an area exposed to splashing water since the film or even the camera itself may be damaged. Thus, the use of a conventional camera is greatly limited under such conditions.

First, experiments as to how water drops enter a camera will be described with reference to FIGS. 1(a)-1(c), in which reference numeral 1 designates a rotary shaft inserted into a bearing 2, reference numeral 3 designates water drops, and reference numeral 4 designates grease. Referring to FIG. 1(a), when the drops 3 reach the small gap between the rotary shaft 1 and the bearing 2, a so-called capillary effect takes place, and the gap is filled with water as shown. However, because of the water surface tension, the water cannot readily enter the camera and, therefore, the water remains in the gap as shown. When the water entering force overcomes the water surface tension, a so-called "soaking" phenomenon takes place in which the water drops enter the camera. When water drops 3 do not directly strike the gap between the rotary shaft 1 and the bearing 2, the water entering force is substantially determined from the weight of the water only and, thus, it is very weak. In other words, in the arrangement shown in FIG. 1(a), the smaller the gap is (or the closer the fitting tolerance is) and the longer the contact length of the bearing 2 is, the higher will be the soaking prevention effect. Referring to FIG. 1(b), the rotary shaft is relieved at 1b and, therefore, the entering of water drops is stopped by the relief part 1b (because of the water surface tension), and the water-proof effect is correspondingly increased. Referring to FIG. 1(c), the rotary shaft 1 has V-shaped grooves 1c cut therein which are filled with grease 4. Since the water is repelled by the grease 4, the water entering force is weakened and the water-proof effect is increased. The constructions shown in FIGS. 1(a)-1(c) can thus prevent water drops from penetrating the gap between the shaft and bearing, however such arrangements have not proven entirely satisfactory.

Shown in FIG. 2 is a conventional shutter dial section, in which reference numerals 5, 6 and 7 designate an upper decoration board, a shutter dial and an operating rubber ring, respectively, as in FIGS. 1(a)-1(c). Reference numeral 8 designates a decoration ring which is caulked to the upper decoration board 1. With the conventional waterproofing techniques as described above, it is difficult to prevent the entering of rain drops 3 into the camera through the gap between the shutter dial 6 and the decoration ring 8 because the gap is directly exposed to a large amount of water and also because the dial 6 may be slightly eccentric with respect to the ring 8 and rotation of the dial may result in an enlargement of the gap on one side.

FIG. 3 illustrates a functional part of a conventional underwater camera, in which reference numerals 5, 6 and 7 designate an upper decoration board, a shutter dial and an operating rubber ring, respectively, as in FIG. 2. An "O"-ring 9 and an "O"-ring supporting ring 10 are additionally provided for waterproofing. The "O"-ring supporting ring 10 is caulked to the upper decoration board 5, so that the ring 10 and the board 5 form one unit. The viscoelasticity of the "O"-ring 9 prevents rain drops 3 from entering into the camera or prevents water from entering thereinto when the camera is used in the water. Since it is necessary to additionally provide the "O"-ring 9 and the "O"-ring supporting ring 10, the number of components of such a device is increased and, therefore, much labor is required in the assembly of the camera. Furthermore, a space for accommodating the increased number of components is necessary. Accordingly, the sealing method shown in FIG. 3, is not preferable since the recent tendency in manufacturing cameras is to minimize their weights and dimensions.

SUMMARY OF THE INVENTION

Accordingly, it is an object of this invention to provide a water-drop-proof and dust-proof device for a rotary operation section of a camera in which the sealing is enhanced without hindering the performance and operability of the camera, to thereby realize a valuable all weather camera. The invention also contributes to a reduction of the camera operating sound. Thus, the usefulness of the device according to the invention should be readily apparent.

The sealing of the camera during possible eccentric movement of the dial is accomplished by securing a flexible rubber ring to the dial and to either the camera casing or a guide ring disposed thereon. As the dial moves eccentrically, the rubber ring flexes while continuously maintaining a seal. To avoid the necessity of assembling an additional port, the flexible ring is preferably merely an extension of the gripping, or operating, ring surrounding the dial.

DETAILED DESCRIPTION OF THE INVENTION

Figure 4A:
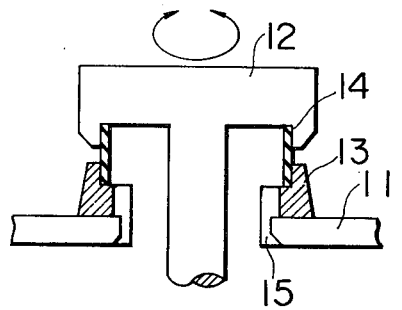
FIGS. 4(a) and 4(b) are sectional views of one embodiment of a seal according to the present invention.
Figure 4B:
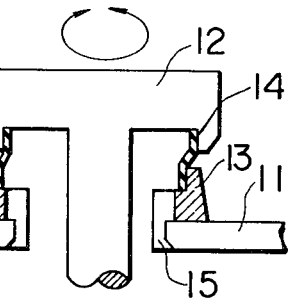

One embodiment of this invention will now be described in detail with reference to FIGS. 4(a) and 4(b) in which reference numeral 11 designates an upper decoration board, and a guide ring 15 is fixedly secured to the board 11 by caulking or the like. Reference numeral 12 designates a shutter dial interlocking with an internal mechanism (not shown), and reference numeral 14 designates a rubber ring, one end portion of which is inserted into the shutter dial 12 and the other end portion of which is inserted into one end portion of an intermediate ring 13, the other end portion of the intermediate ring 13 being placed over the guide ring 15.

Figure 1A:
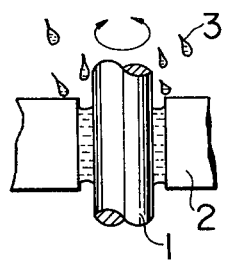
FIGS. 1(a)-1(c) are explanatory diagrams illustrating various states of water drops entering into a camera.
Figure 1B:
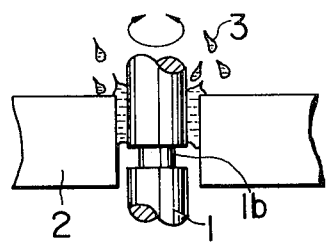
Figure 1C:
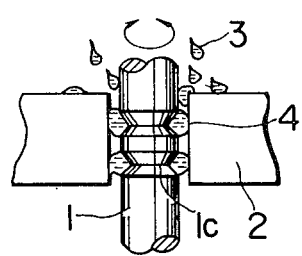

As the angular position of the shaft of the shutter dial 12 is changed, the movement of the shutter dial 12 may be eccentric with respect to the upper decoration board 11. This invention is intended to provide a waterproof and dust-proof device in which such eccentricity is substantially eliminated. The rubber ring 14 serves to eliminate the eccentricity due to its own viscoelasticity and bending characteristic which will absorb any misalignment without transmitting it to the ring 13, and serves as a packing between the shutter dial 12 and the intermediate ring 13. Therefore, if the intermediate ring 13 and the guide ring 15 are designed as shown in FIGS. 1(a)–1(c), waterproofing and dust-proofing will be maintained in the gap between the shutter dial 12 and the upper decoration board 11. When the shutter dial 12 is manually turned, the rubber ring 14 serves to turn the intermediate ring 13 substantially together with the shutter dial 12, while absorbing the eccentricity. If the cooperating surfaces of the intermediate ring 13 and guide ring 15 are configured as shown in FIGS. 1(a)–1(c), a water- and dust-proof seal will be maintained due to the lack of eccentric movement between the two parts and due to the fact that the gap to be sealed is not directly exposed to falling water drops. In the embodiment shown in FIGS. 4(a) and 4(b), the rubber ring 14 is provided between the shutter dial 12 and the intermediate ring 13 in such a manner that the shutter dial 12, the intermediate ring 13 and the rubber ring 14 form substantially one unit, thereby absorbing the eccentricity while the intermediate ring 13 remains in close contact with the guide ring 15. However, it goes without saying that the same effect can be obtained by providing the rubber ring 14 between the guide ring 15 and the intermediate ring 13 and by engaging the intermediate ring 13 with the shutter dial 12 in such a manner that these three components form substantially one unit, thereby absorbing the eccentricity. In the case of FIGS. 4(a)–4(b), the two end portions of the rubber ring 14 are inserted; however, again it goes without saying that the same effect can be obtained by affixing the two end portions with a bonding agent.

Figure 5:
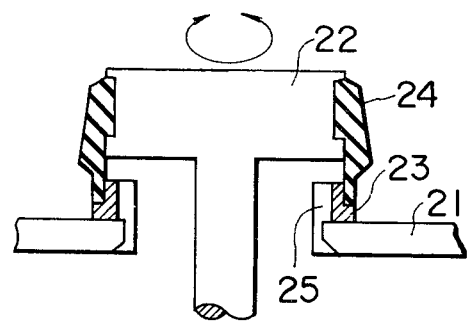
FIG. 5 is a sectional view of a second embodiment of the present invention.

Referring to FIG. 5, reference numeral 21 designates an upper decoration board to which a guide ring 25 is fixedly secured by caulking or the like. Reference numeral 22 designates a shutter dial which is coupled to an internal mechanism (not shown). Reference numeral 23 designates an intermediate ring which is fitted over the guide ring 25. In the drop-proof and dust-proof device for the rotary operation section in the camera shown in FIG. 5, a part of the rubber ring 14 shown in FIGS. 4(a)–4(b) is expanded into a rubber ring 24 in order to absorb the eccentricity and to improve the operability of the rotary operation section.

A third embodiment of the present invention will now be described in detail with reference to FIGS. 6(a)–6(b). Referring to those FIGS., reference numeral 31 designates an upper decoration board which is fixedly secured to a camera body (not shown), and reference numeral 32 designates a shutter dial interlocking with a camera internal mechanism (not shown). An operating, or gripping, rubber ring 33 is bonded to the shutter dial 32 in order to facilitate the operation thereof. A guide ring 35 is fixedly secured to the upper decoration board 31 by caulking. An adjusting washer, or intermediate ring, 34 is placed over the guide ring 35. The adjusting washer 34 is made of a resin whose friction coefficient is lower than that of a viscoelastic material, or it is made of a metal. The operating rubber ring 33 is expanded to form a part 33a which is adapted to abut against the adjusting washer 34. Reference numeral 36 designates water drops or rain drops. Since the friction between the adjusting washer 34 and the operating rubber ring 33 is high, in turning the shutter dial 32 the adjusting washer 34 becomes substantially integral with the shutter dial 32 and therefore the adjusting washer 34 is turned through abutment of the operating rubber ring 33.

Now, the result of experiments performed as to the entering of rain drops 6 into the camera (which will be referred to as "soaking" when applicable) will be described with reference to the part (b) of FIG. 1. As the part 33a of the operating rubber ring 33 is brought into close contact with the part 34a of the adjusting washer 34 while the latter 34 is bent at the part 34a, it may be considered that the ring 33 and the washer 34 are integral with each other. Accordingly, no soaking is observed between the operating rubber ring 33 and the adjusting washer 34. The part 34c of the adjusting washer 34 is in close contact with the part 31a of the upper decoration board 31 if they are both manufactured very flat. Accordingly, the entering of rain drops through the gap between the washer 34 and the board 32 is prevented. However, it will lead to an increase in manufacturing cost to improve the flatness of these parts 34c and 31a to the required extent and instead grease may be applied between the parts to prevent the soaking. If the cooperating surfaces of the guide ring 35 and washer 34 are configured as described above with reference to FIGS. 1(a)–1(c), a leak proof connection will be achieved. For example, the outer periphery 35b of the guide ring may be provided with V-shaped grooves 35a to enhance the sealing effect.

Figure 2:
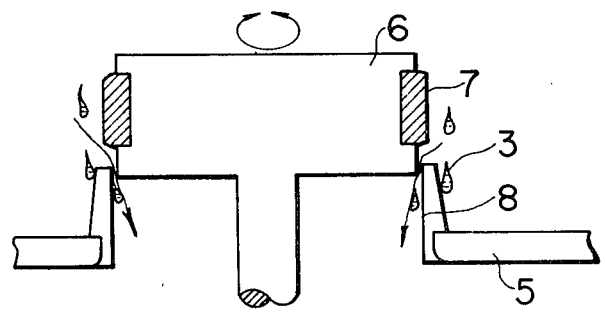
FIG. 2 is a sectional view showing a conventional shutter dial.
Figure 3:
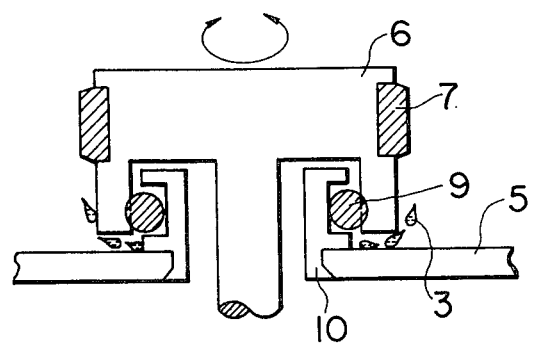
FIG. 3 is a sectional view showing another conventional shutter dial.
Figure 6A:
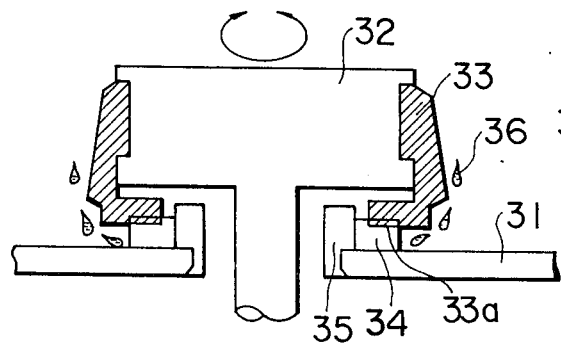
FIG. 6(a) is a sectional view showing a third embodiment of a leak proof seal according to the present invention.
Figure 6B:
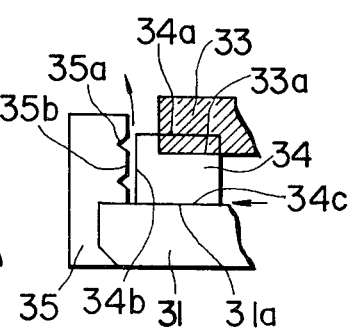
FIG. 6(b) is an enlarged sectional view of a portion of the seal illustrated in FIG. 6(a).

As is apparent from the above description, according to this invention drop-proof and dust-proof devices as shown in FIGS. 5, 6(a) and 6(b) can be readily achieved by only slightly changing the conventional construction shown in FIG. 2. Thus, the increase in manufacturing cost is very small. The rubber ring 33 provided on the periphery of the device in FIGS. 6(a) and 6(b) preferably serves as a packing, a gripping ring and a means for accommodating the eccentricity of the dial 32. In addition, thrust adjustment can be readily achieved by replacing the adjustment washer 34. Furthermore, in the case where an "O"-ring 8 is employed as shown in FIG. 3, the construction of the device is only such that the "O"-ring is stressed against its viscoelasticity. However, if the operating rubber ring 3 is employed as shown in FIG. 1, the device operation is by utilizing the bending property of rubber as is apparent from the part 3a of the operating rubber ring 3.

Referring to FIGS. 6(a) and 6(b), if the part 33a of the operating rubber ring 33 is made of a material having an excellent self-lubrication, it is unnecessary to provide the adjusting washer 34. The adjusting washer 34 is so designed as to become integral with the operating rubber ring 33 through depression and friction due to the viscoelasticity and bending of the operating rubber ring 33; however, the same effect can be obtained by forming the washer and the ring as one unit.

The present invention has been described with reference to the embodiments in which the technical concept of the invention is applied to the shutter dial section. However, it goes without saying that the technical concept of the invention can be applied as well to other rotary operating sections such as the ASA indication ring section, the lens barrel, etc. of a camera.

According to the present invention, a drop-proof and dust-proof seal for in the rotary operation section of a camera is provided which is simple in construction and excellent in practical use.

What is claimed is:

1. In a camera of the type having an external camera casing, an aperture in said casing, an annular projecting portion of said casing surrounding said aperture, a rotatable shaft passing through said aperture and a camera operating member secured to said shaft outside of said camera casing, a water-proof and dust-proof seal comprising:

an intermediate ring member slidably fitted at a circumferential surface around said annular projection, said annular projection being provided with v-shaped grooves on its outer periphery; and an annular flexible ring securing said intermediate ring to said operating member whereby said operating member is freely rotatable and said flexible ring accommodates eccentricities in the rotational movement of said operating member.

2. In a camera of the type having an external camera casing, an aperture in said casing, an annular projecting portion of said casing surrounding said aperture, a rotatable shaft passing through said aperture and a camera operating member secured to said shaft outside of said camera casing, a water-proof and dust-proof seal comprising:

an intermediate ring member slidably fitted at a circumferential surface around said annular projection; and an annular flexible ring securing said intermediate ring to said operating member and extending around the outer periphery of said operating member to act as an operating or gripping ring, whereby said operating member is freely rotatable and said flexible ring accommodates eccentricities in the rotational movement of said operating member.

* * * * *